US007318486B2

(12) United States Patent
Andriolo et al.

(10) Patent No.: US 7,318,486 B2
(45) Date of Patent: Jan. 15, 2008

(54) ADJUSTABLE HANDLE FOR A POWER TOOL

(75) Inventors: Paolo Andriolo, Vicenza (IT); Michael Panosian, Glendale, CA (US)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 38 days.

(21) Appl. No.: 11/084,803

(22) Filed: Mar. 18, 2005

(65) Prior Publication Data

US 2005/0205276 A1 Sep. 22, 2005

Related U.S. Application Data

(63) Continuation-in-part of application No. 11/082,300, filed on Mar. 17, 2005.

(30) Foreign Application Priority Data

| | | | |
|---|---|---|---|
| Mar. 18, 2004 | (CN) | ........................ | 2004 1 0014373 |
| Mar. 22, 2004 | (CN) | ........................ | 2004 1 0014439 |
| Mar. 30, 2004 | (CN) | ................... | 2004 2 0025925 U |

(51) Int. Cl.
*B23D 49/11* (2006.01)

(52) U.S. Cl. ........................... 173/170; 173/18; 173/42

(58) Field of Classification Search ................ 173/170, 173/18, 42
See application file for complete search history.

(56) References Cited

U.S. PATENT DOCUMENTS

| | | | |
|---|---|---|---|
| 4,347,450 | A | 8/1982 | Colligan |
| 4,643,263 | A | 2/1987 | Karden |
| 5,161,293 | A | 11/1992 | Ebbert |
| 5,533,581 | A | 7/1996 | Barth et al. |
| 5,737,982 | A | 4/1998 | Lin |
| 6,000,302 | A | 12/1999 | Chiang |

(Continued)

FOREIGN PATENT DOCUMENTS

| | | |
|---|---|---|
| EP | 1 203 628 | 5/2002 |

(Continued)

OTHER PUBLICATIONS

European Search Report dated Aug. 29, 2005.

*Primary Examiner*—Brian D. Nash
(74) *Attorney, Agent, or Firm*—Knobbe, Martens, Olson & Bear, LLP

(57) ABSTRACT

The present invention relates to a power tool comprising a housing, an output shaft driven by an electric motor for driving a working piece and an adjustable handle. An elongate supporting wall of the housing extends slantwise downwardly from a rear end of the housing and houses the motor. The adjustable handle is adjustably supported by the elongate supporting wall in a secure and reliable manner whilst the whole power tool is compact.

28 Claims, 4 Drawing Sheets

U.S. PATENT DOCUMENTS

| | | | |
|---|---|---|---|
| 6,293,859 B1 * | 9/2001 | Fink et al. | 451/344 |
| 6,308,599 B1 | 10/2001 | Fu-Hui | |
| 6,364,033 B1 | 4/2002 | Hung et al. | |
| 6,386,075 B1 | 5/2002 | Shiao | |
| 6,439,088 B1 * | 8/2002 | Eytchison et al. | 83/13 |
| 6,912,790 B2 * | 7/2005 | James et al. | 30/392 |
| 6,938,706 B2 | 9/2005 | Ng | |
| 2002/0059731 A1 | 5/2002 | Zeiler et al. | |
| 2003/0110645 A1 | 6/2003 | Phillips et al. | |
| 2003/0200841 A1 | 10/2003 | Novotny | |
| 2005/0247466 A1 | 11/2005 | Andriolo et al. | |
| 2006/0005401 A1 | 1/2006 | Borinato et al. | |
| 2006/0025060 A1 | 2/2006 | Funk | |

FOREIGN PATENT DOCUMENTS

| | | |
|---|---|---|
| EP | 1 314 518 | 5/2003 |
| EP | 1 334 789 A2 | 8/2003 |
| EP | 1574297 A1 | 9/2005 |

* cited by examiner

ADJUSTABLE HANDLE FOR A POWER TOOL

CROSS-REFERENCE TO RELATED APPLICATIONS

The present application is a continuation-in-part of co-pending U.S. application Ser. No. 11/082,300 filed on Mar. 17, 2005 and claims priority to Chinese Application No. 200410014373.0, filed Mar 18, 2004; Chinese Application No. 200410014439.6, filed Mar. 22, 2004; and Chinese Application No. 200420025925.3, filed Mar. 30, 2004. All of the above-referenced applications are incorporated herein by reference.

BACKGROUND OF THE INVENTION

1. Field of the Invention

The present invention relates to a power tool with an adjustable handle.

2. Description of the Related Art

In order to improve the comfort of using a power tool in different operational states, it is known to make the handle of the power tool adjustable. EP-A-1203628 and U.S. Pat. No. 5,533,581 disclose adjustable handles for power tools (in particular for a reciprocating saw and a drill). The housing of such power tools is generally elongated and the adjustable handle is pivotally attached to a rear end of the housing. One drawback of such a construction is that the adjustable handle is not securely and reliably supported and may therefore be dangerous. Another drawback is that the structure of the power tool as a whole is inconveniently bulky.

SUMMARY OF THE INVENTION

A main object of the present invention is to provide a power tool having a rigid structure for securely supporting an adjustable handle.

Another object of the present invention is to provide a power tool having a compact structure.

Viewed from a first aspect the present invention provides a power tool comprising:

an electric motor;

a working piece for mounting a cutting element;

a housing for housing the electric motor towards a first end, wherein the housing is adapted to externally mount the working piece at a second end;

an output shaft driven by the electric motor for driving the working piece;

a handle, wherein an elongate supporting wall at the first end of the housing is adapted to support the handle substantially in a common plane with the housing in a manner such that the handle is selectively angularly adjustable relative to the housing or interlocked with the housing.

Typically the housing is multiply walled. The elongate supporting wall may extend slantwise and downwardly from the remaining walls of the housing. Preferably the elongate supporting wall is an elongate abutment wall.

Preferably an angle $\alpha$ is formed between an axis of the motor and an axis of the output shaft, wherein a is greater than zero but less than 180 degrees. Particularly preferably $\alpha$ is about 90 degrees.

Preferably the elongate supporting wall is substantially U-shaped. Preferably the elongate supporting wall substantially encapsulates a part of the handle.

In a preferred embodiment, the elongate supporting wall comprises:

a guiding structure and the handle comprises:

a guided structure, wherein the guided structure is slidably engaged with the guiding structure.

The guiding structure and guided structure are of a complementary male and female configuration. Typically the guiding structure slidably engages the guided structure in a lateral direction (eg perpendicular to the axis of the elongate supporting wall).

Particularly preferably the guiding structure is a pair of arc-shaped guiding bars and the guided structure is a pair of arc-shaped slots to slidably receive the guiding bars. Typically the pair of guiding bars extend laterally in opposite directions (eg perpendicular to the axis of the elongate supporting wall). Preferably the pair of guiding bars extend laterally inwardly.

Preferably the elongate supporting wall comprises:

an abutment surface selectively abuttable against an outer circumferential surface of the handle. The abutment surface may be substantially perpendicular to the plane of the housing. The abutment surface may be substantially perpendicular to the plane of the handle.

Preferably when the abutment surface is abutted against the outer circumferential surface of the handle, the handle is interlocked with the housing.

The abutment surface may extend between the pair of guiding bars. Preferably the abutment surface is stepped. Preferably the abutment surface comprises: a pair of raised shoulders selectively abuttable against an outer circumferential surface of the handle.

Preferably when the pair of raised shoulders is abutted against the outer circumferential surface of the handle, the handle is interlocked with the housing.

The pair of raised shoulders may be substantially perpendicular to the plane of the housing. The pair of raised shoulders may be substantially perpendicular to the plane of the handle.

Preferably the handle is substantially D-shaped. Preferably the handle has a distal gripping portion contiguous with a proximal non-gripping portion supported on the elongate supporting wall of the housing, wherein an outer circumferential surface of the proximal non-gripping portion is provided with an elongate engaging portion arcuately engageable with the elongate supporting wall so that the handle can slide along the elongate supporting wall to allow the orientation of the handle and the housing to be angularly adjustable.

In a preferred embodiment, the handle is substantially D-shaped and the elongate supporting wall is arc-shaped, wherein the outer circumferential surface of the proximal non-gripping portion is arc-shaped to generally match the elongate supporting wall.

In a preferred embodiment, the power tool further comprises:

a transmission device connected between the motor and the output shaft, wherein the transmission device includes a bevel gear.

Preferably the power tool is an electrical drill or a reciprocating saw.

Preferably the elongate supporting wall comprises:

a first distortable structure at a first position;

a second distortable structure at a second position laterally opposed to the first position, wherein the first distortable structure and second distortable structure are laterally couplable so that a part of the of the handle (eg the proximal non-gripping portion) is encapsulated by the elongate supporting wall of the housing. The first distortable structure and second distortable structure may be laterally coupled by coupling pins or fasteners.

The first distortable structure and/or the second distortable structure may be an apertured flange (preferably a twin apertured flange). The or each aperture on respective flanges is coincident to receive a lateral connecting pin or fastener.

An actuating member adjacent to the surface of the first distortable structure may be actuatable to cause the outer circumferential surface of the handle to be abutted against the elongate supporting wall to interlock the handle with the housing. For example, each end of the actuating member may comprise an eccentric cam which when the actuating member is actuated causes the first distortable structure to inwardly displace (eg rotate inwardly and distort) to cause the outer circumferential surface of the handle to be abutted against the elongate supporting wall to interlock the handle with the housing.

Preferably a clearance is defined between the first distortable structure and the second distortable structure when the actuating member is not actuated.

Typically the elongate supporting wall is in the common plane of the housing and handle.

Viewed from a further aspect the present invention provides a power tool comprising:

a housing, an output shaft positioned in one end of the housing and driving a working piece, an electric motor, an adjustable handle and a support member extending slanted downwardly from an other end of the housing and housing the electric motor, and the adjustable handle being adjustably supported by the support member.

BRIEF DESCRIPTION OF THE DRAWINGS

The features and advantages of preferred embodiments of the present invention may be better understood by reference to the accompanying Figures in which.

DETAILED DESCRIPTION OF THE PREFERRED EMBODIMENT

Figure 1:
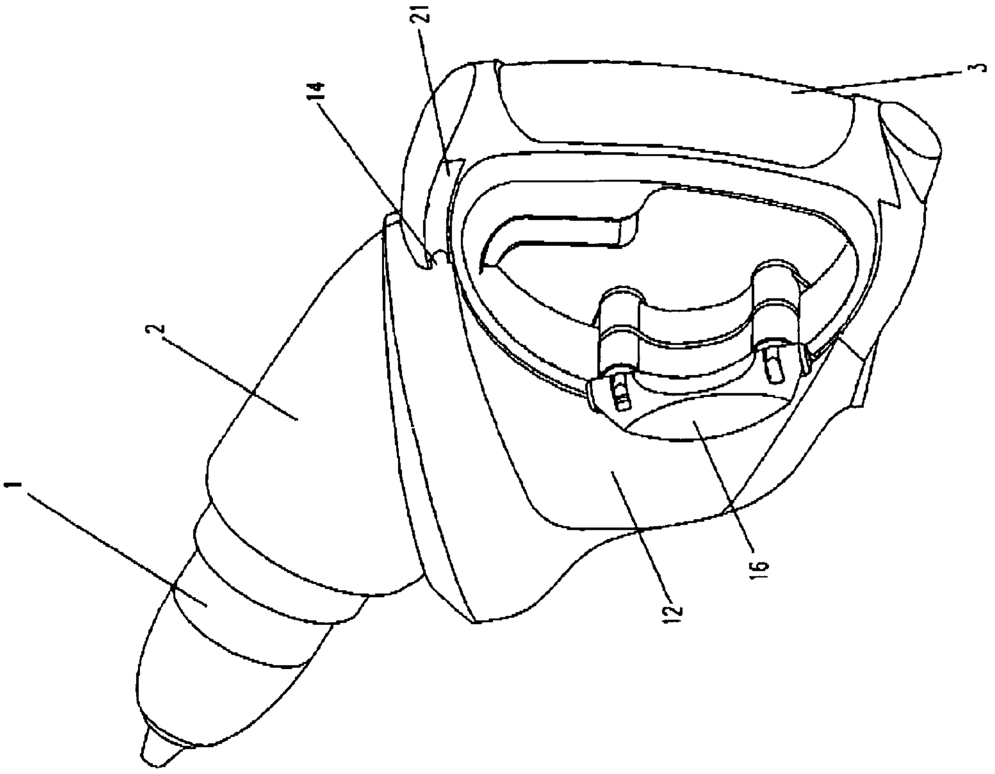
FIG. 1 is a perspective view of an embodiment of a power tool according to the present invention.
Figure 2:
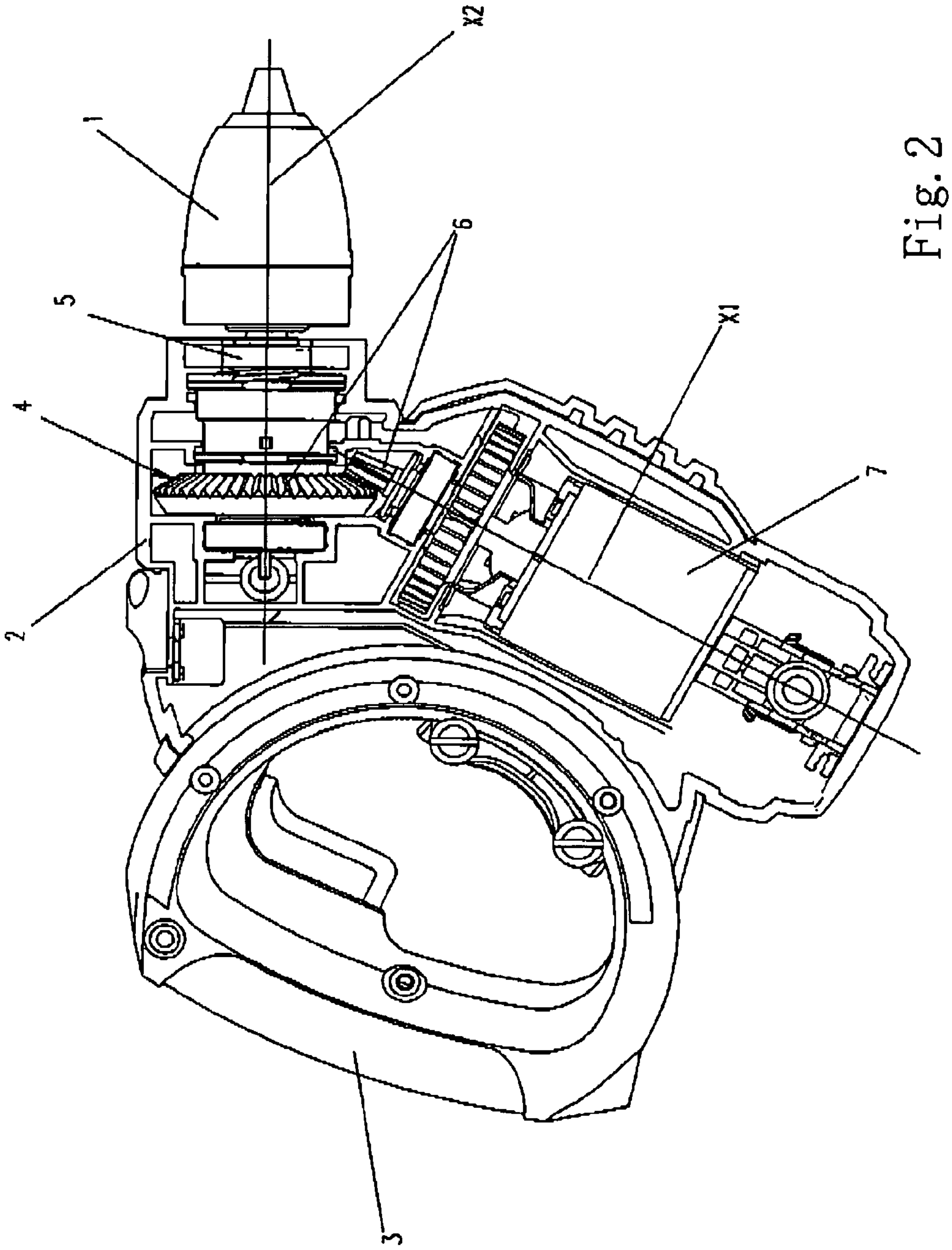
FIG. 2 is a partial cross-sectional view of FIG. 1.

Referring to FIG. 1, a power drill includes generally a housing 2 for the main mechanical and electrical components of the drill, a working piece 1 mounted on a distal end of the housing 2 and an adjustable handle 3 supported on an elongate supporting wall 12 of the housing 2. The elongate supporting wall 12 extends rearwards and slantwise from the remainder of the housing 2.

Within the housing 2, a transmission device 4 couples a rotary motor 7 and an output shaft 5 which directly drives the working piece 1 and includes a pair of bevel gears 6. An angle • of about 90 degrees is formed between an axis X1 of the motor 7 and an axis X2 of the output shaft 5. Thus the housing 2 is effectively a T shape. The part of the housing 2 bearing the elongate supporting wall 12 is a motor-containing part which is contiguous with (and substantially perpendicular to) a transmission device-containing part. The handle 3 is substantially D-shaped with a distal gripping portion 32 contiguous with a proximal non-gripping portion 34.

A locking assembly 16 interlocks the housing 2 to the handle 3 when the desired relative orientation of the distal gripping portion and the housing 2 is achieved. Preferred locking assemblies 16 are described in detail in a co-pending U.S. application filed in a common name with Ser. No. 11/082,300. The content of the co-pending application is incorporated herein by reference.

Figure 3:
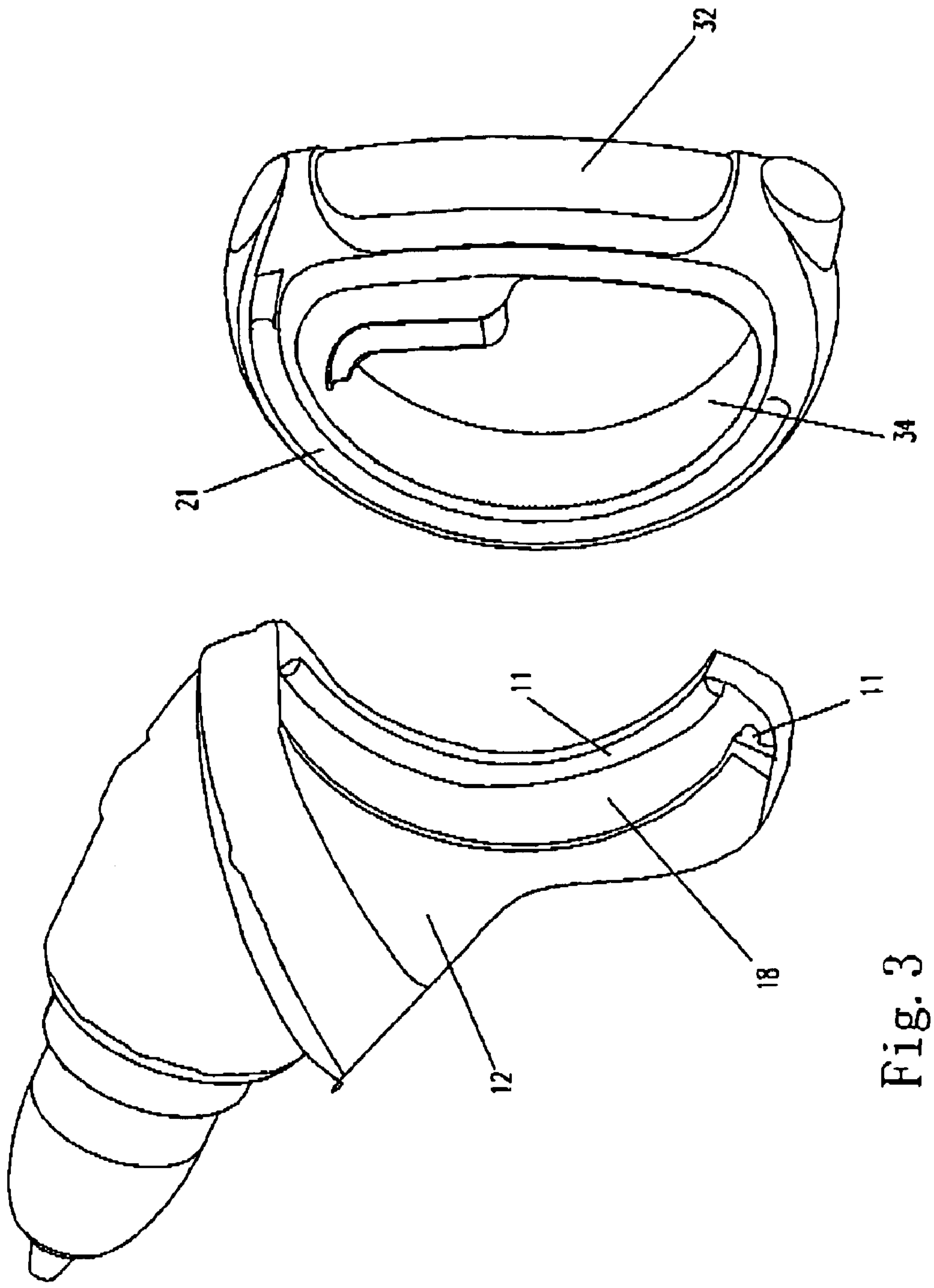
FIG. 3 is an exploded perspective view of the power tool of FIG. 1 with the locking assembly removed.
Figure 4:
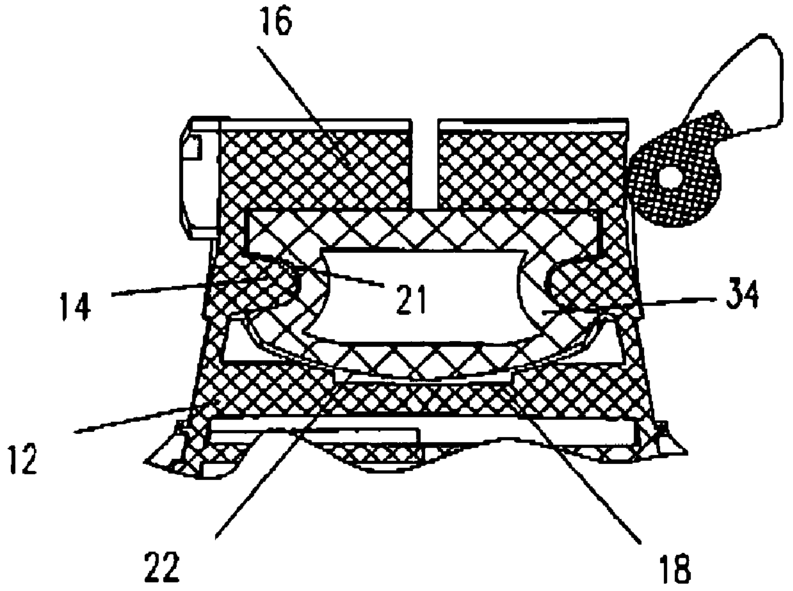
FIG. 4 is a cross-sectional view of the locking assembly and the adjustable handle when the locking assembly is in an unlocking state.
Figure 5:
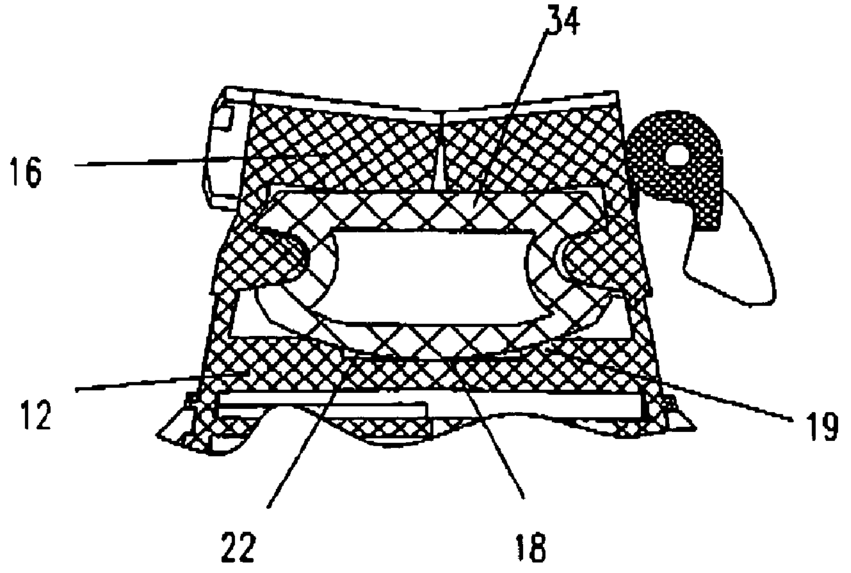
FIG. 5 is a cross-sectional view of the locking assembly and the adjustable handle when the locking assembly is in a locking state.

As shown in FIGS. 3 to 5, each side face of the proximal non-gripping portion 34 is provided with an arc-shaped bar 14 defined inwardly and along the elongate supporting wall 12. The proximal non-gripping portion 34 can slide along the arc-shaped bar 14 so that the handle 3 is adjustably mounted on the elongate supporting wall 12.

The elongate supporting wall 12 comprises a support surface 18 and a pair of raised shoulders 19 formed between the arc-shaped bars 14 to abut against an outer circumferential surface 22 of the proximal non-gripping portion 34 of the handle 3 when the handle 3 is interlocked with the housing 2.

The configuration of the locking assembly 16 in an unlocked state is shown in FIG. 4. A small void is formed between the outer circumferential surface 22 of the handle 3 and the support surface 18 and raised shoulders 19. Thus the handle 3 can slide relative to the housing 2 in a common plane to a desired relative angular orientation. The configuration of the locking assembly 16 in a locked state is shown in FIG. 5. The outer circumferential surface 22 of the proximal non-gripping portion 34 abuts against the abutting surface 18 and the pair of shoulder 19 whereby the handle 3 is securely and reliably interlocked with the housing 2 and supported by the elongate supporting wall 12.

What is claimed is:

1. A power tool comprising:

an electric motor having a first axis; a working piece for mounting a cutting element;

a housing having a proximal end and a distal end, the housing containing the electric motor towards the proximal end thereof, wherein the housing is capable of externally mounting the working piece at the distal end thereof, and wherein the housing comprises a concave surface disposed at the proximal end thereof;

an output shaft driven by the electric motor for driving the working piece, the output shaft having a second axis, the first and second axes defining a plane, wherein the output shaft is disposed at the distal end of the housing; and a handle, wherein an elongate supporting wall at the proximal end of the housing is capable of arcuately supporting the handle such that the handle rotates about an axis that is perpendicular to the plane, wherein said handle comprises a convex surface, and wherein the convex surface of the handle engages with the concave surface of the housing.

2. The power tool as defined in claim 1 wherein an angle $\alpha$ is formed between the first axis and the second axis, wherein $\alpha$ is greater than zero but less than 180 degrees.

3. The power tool as defined in claim 2 wherein $\alpha$ is about 90 degrees.

4. The power tool as defined in claim 1 wherein the elongate supporting wall encapsulates a part of the handle.

5. The power tool as defined in claim 1 wherein the elongate supporting wall comprises a guiding structure and the handle comprises a guided structure, wherein the guided structure is slidably engaged with the guiding structure.

6. The power tool as defined in claim 5 wherein the guiding structure is a pair of arc-shaped guiding bars and the guided structure is a pair of arc-shaped slots to slidably receive the guiding bars.

7. The power tool as defined in claim 5 wherein the elongate supporting wall comprises an abutment surface selectively abuffable against an outer circumferential surface of the handle.

8. The power tool as defined in claim 7 wherein when the abutment surface is abutted against the outer circumferential surface of the handle, and wherein the handle is interlocked with the housing.

9. The power tool as defined in claim 7 wherein the abutment surface is stepped.

10. The power tool as defined in claim 7 wherein the abutment surface extends between the pair of guiding bars and comprises a pair of raised shoulders selectively abuttable against an outer circumferential surface of the handle.

11. The power tool as defined in claim 10 wherein when the pair of raised shoulders is abutted against the outer circumferential surface of the handle, and wherein the handle is interlocked with the housing.

12. The power tool as defined in claim 1 wherein the handle is substantially D-shaped.

13. The power tool as defined in claim 1, wherein said power tool is an electrical drill or a reciprocating saw.

14. A power tool according to claim 1, further comprising a locking assembly for locking the handle at several different positions by engagement and disengagement.

15. A power tool according to claim 1, wherein an arcuate elongate track extends generally along an elongate axis of the eongate supporting walll and the handle is engageable with and arcuately slidable along the track.

16. A power tool according to claim 15, wherein the handle is engaged with the track in a lateral direction substantially perpendicular to the elongate axis.

17. A power tool according to claim 15, wherein the track comprises a pair of arcuate elongate bars, and the handle comprises a pair of arcuate elongate slots, and wherein each slot receives respective bar and allow it to slide therein.

18. A power tool according to claim 15, wherein the output shaft defines a longitudinal axis, and wherein the longitudinal axis crosses the elongate axis.

19. A power tool according to claim 15, further comprising a locking assembly for locking the handle at several different positions by engagement and disengagement.

20. A power tool according to claim 1, wherein the proximal end is opposite to the distal end, and the concave surface is concaving from the proximal end to the distal end.

21. A power tool according to claim 1, wherein the housing defines a groove at the proximal end, and the concave surface is formed as a bottom surface of the groove.

22. A power tool according to claim 1, wherein the handle has a distal gripping portion and a proximal non-gripping portion, and the convex surface is formed as an outer circumferential surface of the proximal non-gripping portion.

23. A power tool according to claim 1, further comprising a locking assembly for locking the handle at several different positions by engagement and disengagement.

24. A power tool according to claim 1, wherein the housing comprises a guiding member at a proximal end thereof, wherein said handle is a closed loop handle having a guided member engaged with the guiding member, and wherein the output shaft can be angularly adjusted with respect to the handle via a relative arcuate motion between the guiding member and the guided member.

25. A power tool according to claim 24, wherein the guided member is a segment of the closed loop handle.

26. A power tool according to claim 24, wherein the closed ioop handle is substantially D-shaped.

27. A power tool according to claim 24, wherein the guiding member is a pair of arc-shaped slots and the guided member is a pair of arc-shaped guiding bars received in respective slots, and the arcuate motion occurs when the bars move in respective slots.

28. A power tool according to claim 24, further comprising a locking assembly for locking the closed loop handle at several different positions by engagement and disengagement.

* * * * *